United States Patent
Engelmann

[11] 3,722,524
[45] Mar. 27, 1973

[54] FLOW DIVIDER VALVE
[75] Inventor: Roger F. Engelmann, Racine, Wis.
[73] Assignee: J. I. Case Company, Racine, Wis.
[22] Filed: Apr. 30, 1971
[21] Appl. No.: 138,923

[52] U.S. Cl..................................137/101, 137/118
[51] Int. Cl..............................................G05d 11/00
[58] Field of Search......................137/100, 101, 118

[56] References Cited

UNITED STATES PATENTS

| 3,554,213 | 1/1971 | Yoshino | 137/101 |
| 2,291,229 | 7/1942 | Johnson | 137/101 |
| 2,593,185 | 4/1952 | Renick | 137/101 |
| 2,960,102 | 11/1960 | Margida | 137/118 |

FOREIGN PATENTS OR APPLICATIONS

| 534,599 | 10/1955 | Italy | 137/118 |
| 487,564 | 12/1953 | Italy | 137/101 |

Primary Examiner—Martin P. Schwadron
Assistant Examiner—David J. Zobkiw
Attorney—Arthur J. Hansmann

[57] ABSTRACT

A valve body having an inlet opening and two outlet openings and an intermediate chamber. Two spools are slidably disposed in the chamber and have fluid passageways which move relative to the valve body outlet openings for varying the flow through the outlet openings. The spools are spring-biased and the spring pressure is adjustable. Also, a spool control member is disposed in the body for adjustably setting the limit position of the spools relative to their sliding movement for limitly setting the amount of flow through the valve.

8 Claims, 2 Drawing Figures

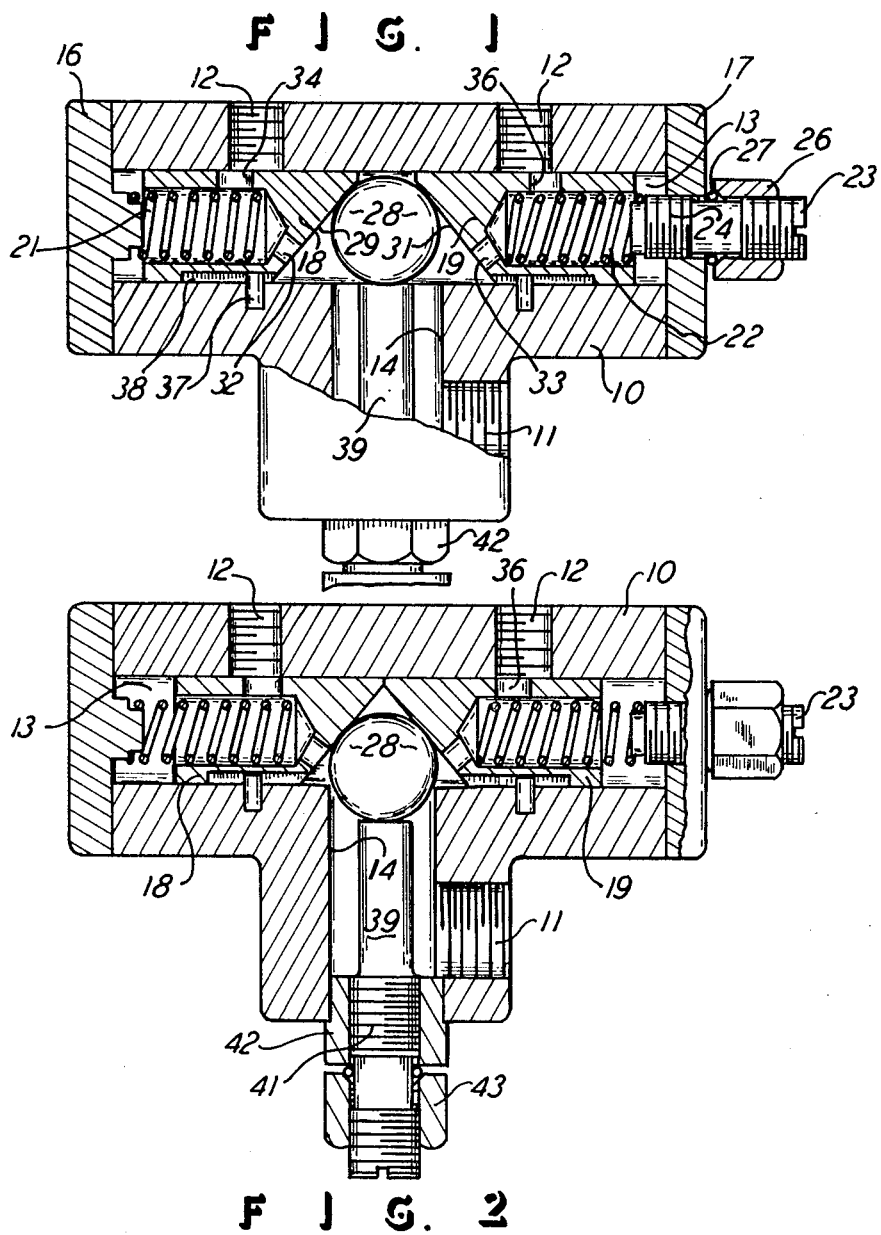

FLOW DIVIDER VALVE

This invention relates to a flow divider valve of the type which receives fluid in one passageway and distributes it to two or more passageways as the fluid passes from the valve. This type of valve is concerned with equally dividing the flow of fluid so that equal quantities of fluid will be passed from the valve for operating two or more powered units, such as fluid cylinders, motors, or whatever.

BACKGROUND OF THE INVENTION

Flow divider valves are well known in the art of fluid-flow utilization and control. These valves commonly exist in the form of a valve body having a fluid inlet and two fluid outlet passages and an intermediate chamber which has movable spools in the chamber. The spools in turn have passageways which are in adjustable flow communication with the outlets of the valve body so that the quantity of fluid passing through the valve body outlets can be regulated. Such regulation commonly occurs in the form of providing an equal distribution of flow through the two or more valve body outlets, and this is the purpose of the present invention.

The flow divider valve of the present invention is one which immediately and accurately responds to a change in quantity of flow through either outlet of the valve. Thus, with the spools slidably operative over the valve body outlets, when flow increases through one of the outlets, by virtue of the power cylinder or whatever unit is connected to that outlet and calling for more flow, the spool in communication with that outlet will sense the fluid-pressure drop created by the increased flow, and that spool will then slide over the outlet to restrict the flow through that outlet. At the same time, the other spool acting on the other valve body outlet will slide to increase the flow through the other outlet. With this mutual sliding action of the spools, the flow through the two or more outlets is maintained in the desired balanced condition.

Prior art flow dividers generally accomplish the aforementioned feature of balancing or dividing the flow of fluid, but they do not do so in the sensitive and accurate manners attending the flow divider of the present invention. Thus, the prior art is aware of flow dividers having two slidable spools, such as shown in U.S. Pat. Nos. 2,593,185 and 3,198,203, but these flow dividers do not operate in the manner described herein, nor are they necessarily for the purpose of the flow divider described herein.

Thus, flow dividers of the prior art are generally expensive and elaborate constructions which require careful machining and which frequently do not provide for adjustment to compensate for manufacturing tolerances, construction variations, and like common occurrences. Also, to assure that the prior art spools operate in unison to mutually govern the flow through the respective outlets, the spools are physically connected together so that they move together, and the valve must therefore be constructed to provide for the alignment of the spools and the connections therebetween. Still further, the prior art flow dividers commonly employ additional valve members for controlling the flow beyond the spools, and such flow control is achieved, in the present invention, by the arrangement of the spools and the valve body themselves so that no additional valves or the like are required in the present invention.

Still further, the prior art divider valves require the close tolerances and careful manufacture in the entire valve so that the achievement of any sensitive and accurate movement in the spools can be accomplished. In contrast, the present invention does not require the close tolerances and careful machining or manufacturing, since the valve spools themselves are sufficiently self-sealing, and they are highly responsive to changes in fluid pressure.

Still further, the prior art units are commonly arranged so that only the spool members themselves serve to adjust the flow through the valve, such as when it is desired to increase or decrease the flow through one valve outlet to balance that flow in accordance with the flow through the other valve outlet. In contrast to that, the present invention provides additional means for governing the fluid-flow through the valve so that both the additional means and the two spools all are available and function for controlling the flow to thereby give optimum accuracy and speed in achieving the desired balance of flow through the valve.

Other objects and advantages of this invention include the provision of a flow divider valve which permits balanced flow of fluid through the valve and does so with an inexpensive, easily manufactured and maintained, easily installed and operated, and a highly reliable flow divider valve.

Still further, the flow divider valve of the present invention achieves the object and advantage of a fully adjustable valve through means which are very easy to provide and which are operated simply by turning a screw, for both the purpose of balancing pressure on the two spools and for the purpose of selecting the quantity of flow passing through the valve, all in two separate but simple screw type adjustment members.

BRIEF DESCRIPTION OF THE DRAWINGS

FIG. 1 is a longitudinal and substantially a sectional view of a preferred embodiment of this invention and showing the parts in one adjusted position.

FIG. 2 is a view similar to FIG. 1 but showing the parts in another adjusted position.

DETAILED DESCRIPTION OF THE PREFERRED EMBODIMENT

A valve body 10 has a fluid inlet opening 11 and two fluid outlet openings 12 and an intermediate chamber 13. The fluid inlet 11 is in flow communication with an opening 14 extending from the exterior of the body 10 and into flow communication with the chamber 13. Thus it will be understood that fluid can enter the opening 11 and flow through the opening 14 and into the chamber 13 and out the two outlet openings 12. Of course suitable connections can be made with the openings 11 and 12, such as a fluid supply line can be connected to the opening 11 to bring fluid into the valve body 10 and under pressure, and hydraulic cylinders, fluid motors, or any such fluid mechanism can be connected to the fluid outlets 12, all in a well-known manner.

The chamber 13 is indicated to be cylindrical and extends between the valve body end caps 16 and 17 which make the valve body fluid tight, except for the openings 11 and 12. Two spools 18 and 19 are preferably cylindrically shaped and are slidably disposed in the chamber 13. Compression springs 21 and 22 respectively abut the spools 18 and 19 to urge the spools toward each other as the spring 21 bears against the end cap 16 and the spring 22 bears against an adjustment screw 23. Thus the screw 23 threads into the end cap 17, and is adjustable in and out of the cap, by virtue of the threaded section 24 threaded into the cap 17. A pressure restraining and lock nut 26 is also threaded on the screw 23 to retain the screw 23 in its rotated or adjusted position and to provide the fluid-tight arrangement of the screw 23 with the cap 17, by virtue of the fluid-sealing ring 27.

Thus it will be readily seen that the adjusted position of the screw 23 will affect the compression force in the spring 22 which in turn bears against the spool 19 and thus urges the spool 19 toward the spool 18, in a manner now described. A flow restrictor and spool positioning member 28 is provided in the form of a sphere disposed between the spools 18 and 19 and is in contact with the oblique surfaces 29 and 31, respectively, of the spools 18 and 19. Thus the springs 21 and 22 cause the spools 18 and 19 to continuously bear against the sphere 28 so that variations in the compressive force of spring 22, as established by the adjustment screw 23, will be transmitted through the sphere 28 and to the spool 18 so that the spools can be readily and accurately set in the desired adjusted positions.

The spools 18 and 19 have fluid inlet ports 32 and 33, respectively, and they have fluid outlet ports 34 and 36, respectively. Thus it will be understood that fluid entering the chamber 13 will pass through the ports 32 and 33 and to the ports 34 and 36 which are commonly in fluid-flow communication with the valve body outlets 12.

Guide pins 37 are fixed in the valve body 10 and extend into grooves 38 in the spools 18 and 19 so that the spools 18 and 19 remain oriented as shown and thus the spool outlet ports 34 and 36 remain aligned with the valve body outlets 12.

A threaded stem 39 extends along the valve body opening 14 and abuts the sphere 28 to position the latter relative to the spools 18 and 19, as shown between FIGS. 1 and 2 in the two different positions of the sphere 28. Thus the stem 39 has threads 41 extending through a nut 42 affixed to the valve body 10. A fluid-pressure and jam nut 43 also extends over the stem 39 to maintain the adjusted position of the stem 39. Thus it will be seen that the stem 39 is an adjuster which can be adjustably set into and out of the valve body 10 to position the sphere 28 between its upper position in FIG. 1 and its lower position in FIG. 2. Such positioning permits the spool springs 21 and 22 to position the spools and thus position the spool outlet ports 34 and 36 relative to the valve outlets 12. This positioning of course permits limit positioning of the spools 18 and 19 toward each other such that, in the FIG. 1 position, the spools permit minimum flow through the ports 34 and 36, and, in the FIG. 2 position, the spools permit maximum flow through these ports which are then fully open to the valve body outlets 12.

Still further, it will now be understood that when fluid-flow increases through say the right-hand outlet 12, as viewed in FIG. 1, the fluid-pressure will be decreased at that right-hand outlet 12 and this will cause the spool 19 to slide to the right and thus the spool outlet port 36 will restrict the flow through the right-hand port 12. At the same time, the sphere 28 will be permitted to move to the right, and the spool 18 will also move to the right and thus its port 34 will permit greater flow through the left-hand outlet 12, and thus the flow through the two outlets tends to again be balanced even though the device connected to the right-hand outlet 12 had required a momentary greater flow. A further novel feature of the flow divider is that the sphere 28 will move to the right, as viewed in FIG. 1, and it will thus alter the flow of fluid from the opening 14 and into the chamber 13 since the sphere 28 will be blocking at least a part of the flow from the cylindrical opening 14 and directly into the chamber 13 toward the spool 19. This action of the center member or sphere 28 thus further controls the flow of fluid and serves to retain the desired balance of flow and balance of fluid-pressure.

What is claimed is:

1. A flow divider valve comprising a valve body having a fluid inlet and two fluid outlets and an intermediate chamber connected to said inlet and said outlets, two spools slidably disposed in said chamber and being movable over respective ones of said outlets, said spools each having a fluid passageway in fluid-flow communication with a respective one of said outlets for controlling flow of fluid from said inlet to said outlets, said spools being unconnected relative to each other and free of each other and in snug sliding engagement with said chamber and with each of said spools having its said fluid passageway disposed to register in direct flow with a respective one of said outlets and being slidable thereover for varying the size of the flow passageway through said fluid passageways and thereby alter the quantity of flow to said outlets, said spools being independently slidable in said chamber and directly over each respective said outlet according to the magnitude of the fluid pressure at each said outlet, means operative on said spools for influencing the respective position of registry of each of said fluid passageways of said spools relative to said outlets, and a member adjacent said inlet and in the path of flow through said inlet and movable toward and away from said inlet and in accordance with the sliding movement of said spools for altering the flow of fluid through said inlet.

2. The flow divider valve as claimed in claim 1, wherein said member is in contact with said spools, and an adjuster operable on said member for positioning said member relative to said spools for selectively spacing said spools apart to position said spool passageways relative to said outlets.

3. The flow divider valve as claimed in claim 1, wherein said spools each have a fluid-pressure surface faced in the direction of said fluid inlet, said means is spring means disposed to yieldingly urge said spools toward each other and toward said inlet.

4. The flow divider valve as claimed in claim 3, wherein said member is a sphere nestable with said inlet and is also in contact with said surfaces.

5. The flow divider valve as claimed in claim 4, including an adjustment member movably mounted on said valve body and in operative contact with said sphere for displacing said sphere across the path of movement of said spools and thereby determine the spacing between said spools and the positions of said spool passageways relative to said outlets.

6. The flow divider valve as claimed in claim 3, wherein said fluid-pressure surfaces are oblique relative to the path of sliding movement of said spools in said chamber.

7. The flow divider valve as claimed in claim 3, wherein said spring means includes two springs oppositely disposed in contact with respective ones of said spools for urging said spools toward each other.

8. The flow divider valve as claimed in claim 7, and including adjustment means operative on said spring means for urging said spools toward each other in accordance with selected adjusted forces.

* * * * *